United States Patent [19]

Kemp

[11] 3,953,638

[45] Apr. 27, 1976

[54] MULTI-PLY ABSORBENT WIPING PRODUCT HAVING RELATIVELY INEXTENSIBLE CENTER PLY BONDED TO HIGHLY EXTENSIBLE OUTER PLIES

[75] Inventor: Clifford B. Kemp, Cincinnati, Ohio

[73] Assignee: The Procter & Gamble Company, Cincinnati, Ohio

[22] Filed: Nov. 26, 1973

[21] Appl. No.: 419,022

[52] U.S. Cl. .............................. 428/154; 156/183; 156/209; 156/291; 428/156; 428/195; 428/298; 428/302
[51] Int. Cl.² ....................... B31F 1/12; B32B 5/00
[58] Field of Search ............. 161/122, 73, 128, 129, 161/148; 162/132, 112; 156/209, 183, 290, 291; 264/282–283; 428/195, 154, 302

[56] References Cited
UNITED STATES PATENTS

| | | | |
|---|---|---|---|
| 3,047,445 | 7/1962 | Gresham | 428/154 |
| 3,424,643 | 1/1969 | Lewis et al. | 162/112 |
| 3,547,723 | 12/1970 | Gresham | 156/209 |
| 3,615,976 | 10/1971 | Endres et al. | 161/129 |
| 3,650,882 | 3/1972 | Thomas | 161/148 |
| 3,674,594 | 7/1972 | Persson | 156/299 |
| 3,684,603 | 8/1972 | Iltis | 156/209 |
| 3,687,797 | 8/1972 | Wideman | 161/129 |
| 3,695,985 | 10/1972 | Brock et al. | 161/148 |
| 3,706,618 | 12/1972 | Persson | 156/179 |
| 3,738,905 | 6/1973 | Thomas | 161/129 |

Primary Examiner—George F. Lesmes
Assistant Examiner—P. J. Thibodeau
Attorney, Agent, or Firm—E. Kelly Linman; Fredrick H. Braun; John V. Gorman

[57] ABSTRACT

A multi-ply absorbent wiping product having a relatively inextensible center ply bonded to highly extensible outer plies to provide superior wet bulk caliper and impression, wet strength and absorption characteristics. The central ply is comprised of wet strength, cellulosic tissue paper having less than about 10 percent stretch. Both sides of the central ply are imprinted with a suitable polymer resin in a regulated pattern covering between about 15 and about 55 percent of the total surface on each side of the central ply. An outer ply of wet strength, highly extensible, creped cellulosic tissue paper is adhered to each of the opposite surfaces of the central ply by feeding the layers between the nip of a pair of synchronously driven, hard-surfaced embossing rolls having a mating pattern of embossments thereon.

26 Claims, 14 Drawing Figures

MULTI-PLY ABSORBENT WIPING PRODUCT HAVING RELATIVELY INEXTENSIBLE CENTER PLY BONDED TO HIGHLY EXTENSIBLE OUTER PLIES

BACKGROUND OF THE INVENTION

1. Field of the Invention

The present invention relates to absorbent creped paper wiping products, particularly to multi-ply towels, and to methods of producing such products. An absorbent wiping product of the present invention is further characterized by a structure having a relatively inextensible central ply with outer plies of highly extensible creped tissue paper intermittently adhered thereto.

Some of the most salient advantages of the present structure over prior art structures include: superior caliper and bulk impression when wet due to the fact that the unadhered areas of the outer plies expand in the Z-direction when the structure becomes wetted; improved wet strength due to the resin reinforcement pattern imprinted on both sides of the central ply; and controlled machine direction to cross-machine direction tensile ratio due to the fact that the reinforcing resin can be applied to the central ply in quantities and patterns designed to meet the desired objectives.

The present invention also has relevance to a paper converting process wherein outer plies of highly creped, cellulosic tissue paper are bonded to a resin-reinforced, relatively inextensible central ply by means of pressure exerted between a pair of synchronously driven, hard-surfaced embossing rolls having mating embossment patterns thereon. Each outer ply is thus bonded by means of the uncured resin to the central ply at mating embossment points on the embossing rolls. After the laminating process has been completed, the resin reinforcing pattern imprinted on each side of the central ply is cured, preferably by the application of thermal energy to the structure, to prevent subsequent delamination in use and to maximize the wet strength of the resin, and hence the wet strength of the absorbent wiping product.

2. DESCRIPTION OF THE PRIOR ART

Multi-ply absorbent wiping products are known to be old in the art. Paper toweling having one or multiple plies has been marketed for many years. The known towels vary in basic physical structural characteristics such as ply construction, basis weight, limpness, stretchability, surface texture and the like. Many such prior art structures, however, lose their strength upon becoming wetted and begin to delaminate and/or disintegrate in use. Increasing the bonding area between the adjacent plies of most prior art multi-layered structures is, however, undesirable due to the fact that the product becomes stiffer, thereby losing its softness and drape, and, depending upon the particular adhesive employed, may become less absorbent.

Another disadvantage of most prior art multi-layered structures is that they tend to lose their bulk upon becoming wetted, thereby detracting from the product's stability and hand. Loss of these desirable features is deemed to be a strong negative factor by most consumers.

Recently issued patents disclosing improved absorbent wiping products points to recognition by the industry of the undesirability of the loss of bulk and strength upon the product's becoming wetted.

U.S. Pat. No. 3,695,985 issued to Brock et al. on Oct. 3, 1972, discloses a high-bulk, laminated product having superior strength, high tear and rupture resistance, and good aesthetics. The structure disclosed by Brock et al. is basically a three-ply product having a central ply comprised of a plurality of substantially continuous filaments of a synthetic polymer, preferably isotactic polypropylene or linear polyethylene. Upper and lower cellulosic paper plies are intermittently bonded to the central ply. The adhesive bond area is preferably between approximately 5 to 50 percent of the total web area. The adhesive employed is printed directly on one side of the central ply, as the open character of its structure allows significant flowthrough to its opposite side. The laminate is formed by bringing the cellulosic outer plies into contact with the adhesively printed, continuous filament web at a squeeze roll. The laminate is passed around a heated drum so that the adhesive sufficiently penetrates the cellulosic layers to assure good laminate strength and yet minimize adhesive strike-through to the outer surfaces of the product. The structure is then preferably passed through a calendar stack to assure good bonding. High bulk is provided by hot embossing the laminate structure to set the continuous filament web into a predetermined three-dimensional pattern. This is accomplished by passing the laminate structure between a set of heated, matched engraved rolls to transform the laminate into a three-dimensional pattern which will be set into the web upon cooling. The resulting laminate structure is characterized, according to the Brock et al. disclosure, by its ability to retain a significant portion of its properties such as its strength and bulk even after it has been saturated or wetted with water, i.e., "the wet thickness is at least about 75% of its dry thickness . . . and generally is 80% or more."

Another example of a multi-layered absorbent wiping product having superior strength and bulk when wetted is disclosed in U.S. Pat. No. 3,650,882 issued to Thomas on Mar. 21, 1972. The Thomas patent discloses a three-ply product in which each layer is comprised of absorbent creped tissue paper. The Thomas structure employs a central ply which is highly elastically extensible, whereas the outer plies are of lesser extensibility. The outer plies are bonded to the central ply in spaced regions to provide unbonded zones between bonds. The adhesive employed in joining the several plies together is sufficiently water-resistant to prevent delamination of the webs when wetted so that the highly creped inner web may expand and fill the unbonded zones, thereby providing superior bulk in the wet product. In a preferred embodiment, the adhesive utilized to secure the several webs together is applied in a very thin film to the embossment points on the innermost surface of each outer ply as the several webs proceed to a nip between a pair of embosser rolls which secure the outer plies to the highly creped central ply. It should be noted that while the aforementioned embosser rolls are preferably rotated in unison, the outer plies will not exactly provide their embossments in opposed relation in the nip, and no attempt is made to control the outermost plies to so provide the embossments in opposition. Because the less extensible outer webs of tissue paper confine the expansion of the central ply largely to the unbonded zones, the highly creped central ply, upon wetting, tends to release its crepe, thereby filling the unbonded zones and tending to bulk the towel.

High-bulk, multi-layered absorbent wiping products having a central ply consisting of an open-mesh, cross-thread fabric and outer plies comprised of cellulosic tissue bonded to each of the opposite faces thereof are also disclosed in U.S. Pat. No. 3,708,383 issued to Thomas et al. on Jan. 2, 1973, and U.S. Pat. No. 3,546,056 issued to Thomas on Dec. 8, 1970. The Thomas et al. patent emphasizes the need for heavy embossing so that a substantial portion of the cellulosic tissue in each of the multi-ply outer layers protrudes through the windows of the open-mesh fabric employed as a central ply. Bonding of the two outermost layers of cellulosic tissue to the open-mesh fabric layer is effected by applying adhesive to both the warp and the fill threads to bond the threads to each other as well as to the outermost tissue layers. The Thomas patent discloses a highstrength wiping product formed by coating the opposite sides of an open-mesh scrim comprised of nylon or a similar material with an adhesive, and then combining the scrim with outer layers of highly creped cellulosic tissue in the absence of substantial pressure to minimize loss of stretch in the outermost plies. The lightly adhered composite web is passed over a series of heated rolls at relatively low tension to bond the scrim to the highly creped outer plies. Because the application of heat causes shrinking of the nylon scrim, bulking of the web in the window areas of the scrim occurs, thereby creating puff zones extending between longitudinally projecting threads.

Still another example of a multi-layered absorbent wiping product is disclosed in U.S. Pat. No. 3,687,797 issued to Wideman on Aug. 29, 1972. According to the disclosure of Wideman, layers of creped cellulosic material are bonded by means of spaced adhhesive patterns to a central elastic layer comprised of foam. By securing each absorbent outer ply to the elastic central ply with spaced adhesive patterns, the central ply, which is under tension when the laminate structure is formed, exerts a compressive force on the paper outer plies in the longitudinal direction when the tension is removed, thereby imparting to the composite product, bulk, compressability, and resiliency in a direction perpendicular to the sheet. The laminate structure is preferably formed by applying a regulated pattern of adhesive to the innermost surfaces of the outer plies and joining the outer plies to the central ply while the central ply is under tension by passing the several layers between the nip of a pair of smooth-surfaced rolls. The resulting product is, according to the disclosure of Wideman, "capable of picking up and retaining many times its own weight of water."

It should thus be apparent that most prior art absorbent wiping products exhibiting satisfactory strength and bulk when wet are relatively expensive due, in some instances, to the use of complex manufacturing processes and, in others, to the use of high cost materials of construction. In addition, prior art structures incorporating foam or fabric-reinforced center plies are often difficult to separate into individual sheets, a feature generally desirable in disposable toweling products.

Applicant, on the other hand, has discovered novel and unobvious means of producing a relatively low-cost, heavyduty, multi-layered absorbent wiping product comprised of cellulosic tissue paper, said absorbent wiping product exhibiting high strength and superior caliper and bulk impression, both wet and dry. Applicant has further discovered that the machine direction to crossmachine direction tensile ratio of product made in accordance with the present invention can readily be adjusted to and accurately maintained at any desired level. In addition, applicant has determined that product made in accordance with the present invention exhibits good drape and absorption characteristics which are generally desirable in a paper towel, and that such product is sufficiently durable, in most applications, to be reusable.

SUMMARY OF THE INVENTION

In a preferred embodimenet, applicant's invention is comprised of a relatively inextensible central ply of cellulosic tissue paper having outer plies of highly extensible creped cellulosic tissue paper intermittently adhered thereto. The central ply is formed from a wet strength paper having less than about 10 percent stretch. An intermittent reinforcing pattern of a suitable polymer resin is imprinted on each surface of the central ply. The resin reinforcing pattern covers between about 15 and about 55 percent of the total surface area on each side of the central ply. The inextensibility of the central ply causes the unadhered areas of the outer plies joined to the central ply by means of the resin to expand in the Z-direction when the laminate becomes wetted, thereby providing superior wet bulk caliper and impression.

The resin reinforcing pattern imprinted on each side of the central ply serves several purposes. First, the wet and dry tensile strength of the absorbent wiping product is increased due to the reinforcing effect on the central ply. Second, the machine direction to cross-machine direction tensile ratio of the finished product may be adjusted in any desired direction by varying the composition of the resin, the imprint pattern, and the amount of resin applied. Third, the resin reinforcing pattern imprinted on both sides of the central ply permits bonding of the highly creped, outer tissue plies to the central ply solely by means of pressure exerted between mating embossment points on a pair of synchronously driven, hard-surfaced embossing rolls.

Accordingly, it is an object of the present invention to provide a low-cost absorbent wiping product having superior wet and dry strength, superior wet bulk caliper and impression, and good drape and absorption characteristics.

It is a further object of the present invention to provide an absorbent wiping product having a machine direction to cross-machine direction tensile ratio approaching 1 to 1.

It is yet another object of the present invention to provide an absorbent wiping product having a wet to dry caliper ratio in the range of 70 to 90 percent.

It is another object of the present invention to provide a heavy-duty absorbent paper wiping product having a high-strength central ply, which product can be easily separated into individual sheets as it is dispensed from a roll.

It is still another object of the present invention to produce a multi-layered absorbent wiping product exhibiting superior bulk and strength, both wet and dry, by imprinting a regulated pattern of reinforcing resin on both sides of a web of tissue paper which is relatively inextensible, and bonding a web of highly extensible, creped tissue paper to each side of said central ply by means of the reinforcing resin contained on said central ply at mating embossment points on a pair of synchronously driven, hard-surfaced embossing rolls.

BRIEF DESCRIPTION OF THE DRAWINGS

While the specification concludes with claims particularly pointing out and distinctly claiming the subject matter which is regarded as the present invention, it is believed that the invention will be better understood from the following description taken in connection with the accompanying drawings, in which:

DESCRIPTION OF THE PREFERRED EMBODIMENTS

Figure 1:
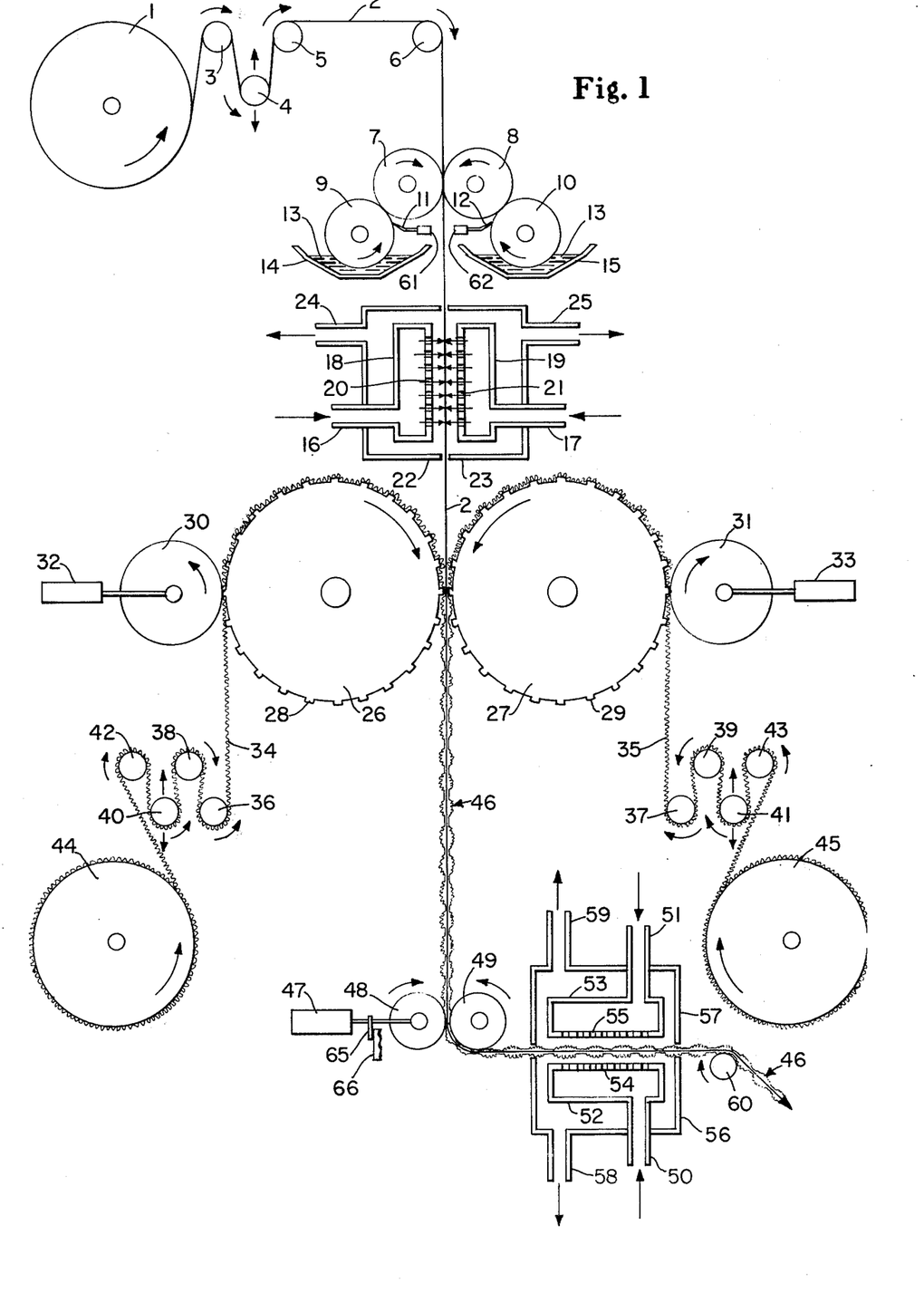
FIG. 1 is a schematic representation of apparatus utilized to produce a preferred embodiment of the multi-ply absorbent wiping structure of the present invention.

FIG. 1 is a schematic illustration of a preferred method for producing the multi-layered absorbent wiping product of the present invention. The central ply 2 is preferably comprised of a wet strength tissue paper that is relatively inextensible, i.e., it has less than about 10 percent stretch prior to the converting process illustrated and described herein. As illustrated in FIG. 1, the central ply 2 is fed from parent roll 1 about fixed rolls, 3, 5 and 6 and vertically movable roll 4 to the nip between a pair of rubber printing rolls 7 and 8. Tension in the central ply 2 is controlled by applying a braking force by means well known in the art to prevent free-wheeling rotation of the parent roll 1 as the central ply 2 is withdrawn, as well as by the positioning of vertically movable roll 4. Tension in the central ply 2 is preferably maintained at a level sufficient to effectively remove most of the residual crepe in the central ply prior to imprinting.

The central ply 2 is preferably imprinted on both sides with a suitable water-resistant polymer resin, preferably of the self-crosslinking variety, by means of rubber printing rolls 7 and 8. Rubber printing rolls 7 and 8 are relatively soft (between approximately 25 and approximately 60 Shore A Durometer), smooth-surfaced rolls which receive an imprint pattern from engraved metal gravure rolls 9 and 10 which are driven in synchronization with printing rolls 7 and 8 and with the movement of the central ply 2. Engraved metal gravure rolls 9 and 10 rotate continuously with their lowermost surfaces in contact with an emulsion of a suitable polymer resin 13 contained in resin troughs 14 and 15. The excess resin 13 which clings to the outermost surfaces of engraved metal gravure rolls 9 and 10 is removed by means of doctor blades 11 and 12. In a preferred embodiment of the present invention, air cylinders 61 and 62 are employed to exert a constant force between each doctor blade and the corresponding gravure roll. In the alternative, the doctor blades 11 and 12 may be mechanically adjusted to a fixed position. The relatively soft rubber on the surfaces of printing rolls 7 and 8 is projected into the recessed areas of the metal gravure rolls 9 and 10, thereby effecting a transfer of the resin to the printing rolls 7 and 8 in a pattern identical to that contained on the engraved metal gravure rolls 9 and 10. Thus, the resin transferred from the engraved metal gravure rolls 9 and 10 to the smooth-surfaced, rubber printing rolls 7 and 8 is that which is carried in the recessed portions of the metal gravure rolls.

In a preferred embodiment of the present invention, the polymer resin is printed on both sides of the central ply 2 in an identical pattern, and the patterns are printed in register with one another, i.e., the reinforcing pattern on one side of the central ply 2 is in effect superimposed with an identical reinforcing pattern on the opposite side. This is accomplished by driving rubber printing rolls 7 and 8 and engraved metal gravure rolls 9 and 10 not only in synchronization with each other, but also in synchronization with the movement of the central ply 2.

In an alternative embodiment of applicant's invention, the polymer resin 13 is imprinted on only one side of the central ply 2. This is, however, generally less desirable due to the fact that more total resin must be applied to obtain central ply strengths equivalent to those obtainable when both sides of the central ply are imprinted, thus resulting in some loss of absorbency in the finished product. In addition, imprinting the central ply 2 with resin on only one side, in the absence of sufficient wicking of the resin to the opposite side, necessitates the use of a conventional laminating adhesive to join the outermost ply on the unprinted side to the central ply.

One example of a polymer resin found highly suitable for use in the present invention is Elvace EP 1962, a self-crosslinking acetate/ethylene copolymer resin available from E. I. DuPont De NeMours & Company, Inc. of Wilmington, Delaware. Other examples of suitable self-crosslinking polymer resins include Elvace EP 1960 and Elvace EP 1968, acetate/ethylene copolymers also available from E. I. DuPont De NeMours & Company, Inc., and Hycar 2600 × 189, an acrylic copolymer resin available from the B. F. Goodrich Company of Akron, Oh. However, any strong, flexible coating having similar properties and available in emulsion form could also be employed.

Figure 3:
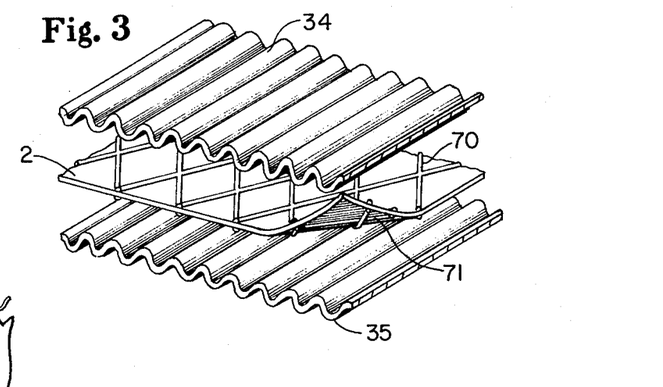
FIG. 3 is an enlarged perspective view of the relatively inextensible central tissue ply after a reinforcing resin pattern has been imprinted on each side thereof and the two outermost plies of highly creped tissue paper utilized in a preferred embodiment of the present invention, shown prior to embossing and laminating.
Figure 5:
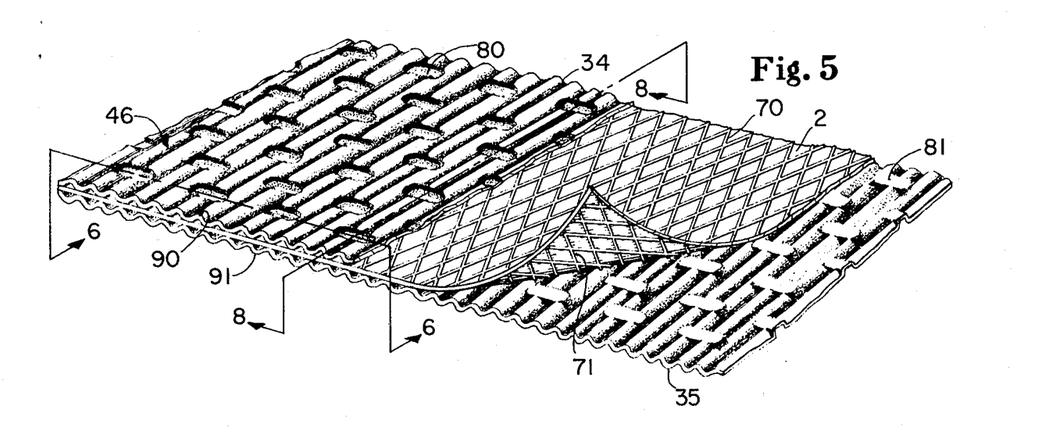
FIG. 5 is an enlarged fragmentary perspective view of an absorbent wiping product produced in accordance with the present invention with portions of the uppermost ply removed and portions of the innermost ply folded back for clarity.
Figure 11:
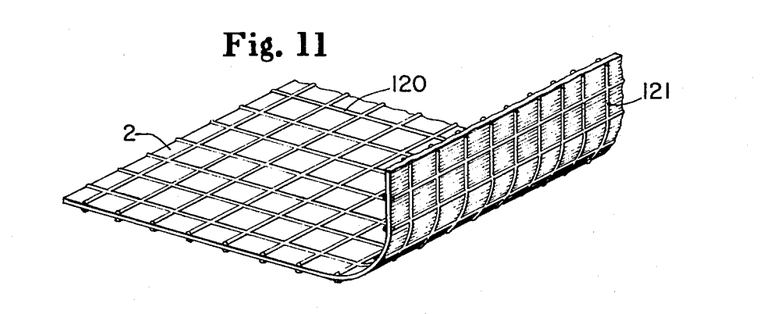
FIG. 11 is an enlarged fragmentary perspective view of a preferred embodiment of a central tissue ply of the present invention imprinted on opposite sides with a rectangular resin reinforcing pattern and folded back to illustrate that the pattern is in register with respect to itself on both sides of the central ply.
Figure 12:
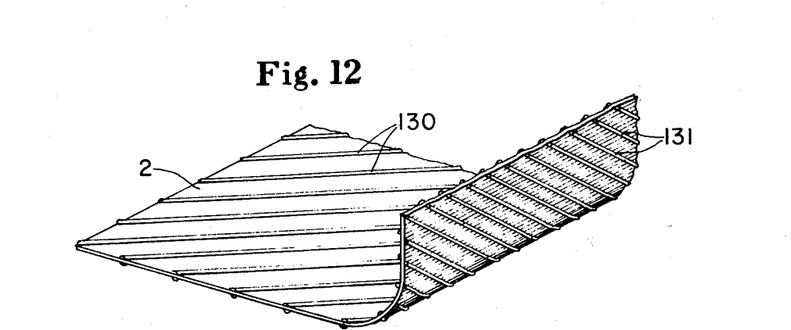
FIG. 12 is an enlarged fragmentary perspective view of another preferred embodiment of a central tissue ply of the present invention imprinted on opposite sides with a series of parallel diagonal lines of reinforcing resin and folded back to illustrate that the oreintation of the diagonal lines on the uppermost side of the central ply is opposite to that of the lines on the lowermost side of the central ply.

The reinforcing resin is preferably applied at a rate between about 1.0 and about 4.0 pounds of solids per 3,000 sq. ft. on each side of the central ply 2, and most preferably at a rate between about 1.5 and about 3.0 pounds of solids per 3,000 sq. ft. The reinforced area constitutes between approximately 15 and approximately 55 percent of the total surface area on each side of the central ply 2. Any number of imprint patterns could be utilized to produce the desired tensile ratio, strength, and bonding area in the finished product. In one preferred embodiment, a diamond-shaped pattern comprised of lines having a thickness of approximately 0.020 inches and spaced 15 lines per inch in the machine direction by 7 lines per inch in the cross-machine direction is utilized. Diamond-shaped reinforcing pattern 70 and 71 printed in register on opposite sides of a central ply 2 are illustrated in FIGS. 3 and 5. Alternative reinforcing patterns are illustrated in FIGS. 11 and 12. FIG. 11 illustrates a pair of rectangular reinforcing patterns 120 and 121 printed on a central ply 2 in register with respect to one another. FIG. 12, on the other hand, illustrates patterns of parallel lines 130 and 131 on the uppermost and lowermost surfaces of a central ply 2. The patterns 130 and 131 are, however, intersecting rather than superimposed.

It is preferable that the areas of the central ply 2 not imprinted with the reinforcing resin 13 be evenly distributed to provide adequate transport for liquid to be absorbed by the final structure. Thus, while it is feasible to utilize a central ply 2 which has been totally covered on one or both sides with resin, this is generally considered to be less desirable.

Greatest strength of the central ply 2 results when the reinforcing resin is imprinted on both sides of the sheet in identical patterns in register with one another.

Because the reinforcing resin 13 is applied to the central ply 2 by means of a printing operation, it is feasible, in accordance with the present invention, to achieve a machine direction to cross-machine direction tensile ratio approaching 1 to 1. A further advantage of the present method of ply reinforcement over prior art techniques lies in the fact that both the tensile strength and tensile ratio of the product are adjustable over a wide range merely by varying the imprinting pattern and the total amount of resin solids applied.

The resin emulsion 13 applied to both surfaces of the central ply 2 serves not only to adjust the tensile ratio and strengthen the central ply, but also, in a preferred embodiment, serves as a bonding medium to join the two outermost layers of highly creped tissue paper 34 and 35 to the central ply. In order to accomplish the aforementioned objective, the resin emulsion must be dried sufficiently to permit retention of emboss in the laminated structure 46 after the outermost plies 34 and 35 have been bonded to the central ply 2 by means of pressure exerted between mating embossment points 28 and 29 on hard-surfaced embossing rolls 26 and 27. On the other hand, the resin emulsion 13 must not be cured prior to bonding the plies 34, 35 and 2 together between embossing rolls 26 and 27, or poor bonding will result, and the structure will tend to delaminate upon wetting and use. To provide the desired amount of moisture removal from the central ply 2 without effecting curing of the resin emulsion imprinted thereon, a hot air dryer is preferably employed. The relatively inextensible central ply 2 typically has a moisture content in the range of about 5 percent prior to application of the resin emulsion 13 to each side thereof. In the case of a central ply having a basis weight of about 10 pounds per 3,000 sq. ft., imprinting each side with a resin emulsion containing about 50 percent resin solids at a rate between about 1.0 and about 4.0 pounds of resin solids per 3,000 sq. ft. typically increases the total moisture content of the central ply to between about 17 and about 33 percent, the increase being due to the addition of the liquid contained in the resin emulsion.

In order to prevent loss of emboss in the laminate structure 46, it is desirable that the total moisture content of the central ply 2 during the laminating operation be reduced to between approximately 2 and approximately 10 percent, preferably to between approximately 2 and approximately 8 percent. At moisture contents greater than about 10 percent, the laminate structure 46 tends to lose its emboss during subsequent processing operations, while at moisture contents less than about 2 percent, curing of the resin may be initiated.

In a preferred embodiment of the present invention, hot air is continuously introduced to both surfaces of the resin-reinforced central ply 2 through flow channels 16 and 17 of distributor boxes 18 and 19 which extend across the entire width of the imprinted central ply 2. The hot air is caused to impinge upon the surfaces of the central ply 2 containing the wet resin emulsion 13 through a plurality of orifices 20 and 21. Most of the hot air which is introduced through flow channels 16 and 17 is collected in collector boxes 22 and 23 which also extend across the entire width of the central ply 2. The collected air is thus forced to exit through flow channels 24 and 25. The exhausted air is preferably reheated and reintroduced through flow channels 16 and 17 by means well known in the art to reduce the thermal energy requirements of the process. Only minor portions of the hot air introduced through flow channels 16 and 17 are lost through the open area existing between collector boxes 22 and 23 and the imprinted central ply 2.

The temperature of the hot air introduced through flow channels 16 and 17 must be sufficiently high to reduce the total moisture content of the imprinted central ply to between about 2 and about 10 percent by the time the central ply exits collector boxes 22 and 23. Applicant has, for example, determined that the moisture content of an imprinted central ply 2 having a basis weight of approximately 10 pounds per 3,000 sq. ft. prior to imprinting can be reduced from between about 17 and about 33 to between about 2 and about 10 percent by subjecting each side of the central ply to a forced convection of 330°F hot air at a head pressure between about 10 and about 15 inches of water for a period of approximately 2.0 seconds. The speed at which satisfactory drying of the central ply 2 can be achieved appears limited only by the need to avoid curing of the resin emulsion 13. Thus, higher hot air temperatures, higher air flows, and more effective distribution of the hot air flow onto the imprinted central ply 2 would tend to reduce the required residence time. Other types of drying mechanism which could also be employed to effect drying of the central ply 2 to the desired level include free convection of hot air, microwave heating, dielectric heating, etc. Forced air convection drying as illustrated schematically in FIG. 1 is, however, preferred because of its greater efficiency.

Experience has also demonstrated that the central ply 2 can be imprinted with a resin emulsion 13 as a separate operation from the converting process, its moisture content reduced sufficiently to permit winding into rolls by means hereinbefore described, and the rolls stored for up to several months at ambient temperatures without appreciable curing taking place.

On-line drying is, however, generally preferable to off-line drying in that it eliminates sticking-together of the central ply 2 which sometimes occurs when the central ply is insufficiently dried before being wound into rolls.

After reduction of the total moisture content of the imprinted central ply 2 to between approximately 2 and approximately 10 percent, the resin adhered to the surfaces of the central ply is still in a condition suitable for bonding of the outermost plies 34 and 35 to the central ply 2 without need for the application of conventional laminating adhesives.

In an alternative embodiment of applicant's invention, the resin-reinforced central ply 2 is completely cured by the application of thermal energy or by other suitable curing means described hereinafter prior to laminating outermost plies 34 and 35 thereto. Because complete curing of the resin contained on the central ply 2 makes it unsuitable for bonding, application of a conventional laminating adhesive to the innermost surfaces of both outermost plies 34 and 35 or to both sides of the central ply 2 is necessitated. One advantage associated with curing the resin-reinforced central ply 2 prior to laminating is a reduction in the thermal or other type of energy input required to effect curing of the resin due to the fact that the curing operation can be combined in a single step with the drying operation and also to the fact that the resin is not shielded by outermost plies 34 and 35 during the curing operation. Application of a conventional laminating adhesive to bond outermost plies 34 and 35 to the central ply 2 does, however, result in some loss of absorbency as well as an increase in stiffness in the final product, and is, therefore, generally considered less desirable than utilizing the uncured resin to bond the structure together.

In a most preferred embodiment of applicant's invention, outer plies of highly creped, wet strength tissue paper 34 and 35 are bonded to the surfaces of the reinforced central ply 2 by passing all three plies simultaneously between the nip of a pair of snychronously-driven, hard-surfaced embossing rolls having mating embossment points 28 and 29 thereon. Because the resin reinforcement printed on the central ply is yet in an uncured state, i.e., chemical cross-linking in the structure has not been initiated, bonding of the outermost plies of highly extensible, creped tissue paper 34 and 35 to the relatively inextensible central ply 2 is effected solely by means of pressure exerted between mating embossment points 28 and 29 on embossing rolls 26 and 27. Thus, the resulting bond between the central ply 2 and each of the outer plies 34 and 35 is formed by means of the reinforcing resin at points which coincide with mating embossment points 28 and 29 on embossing rolls 26 and 27.

Figure 13:
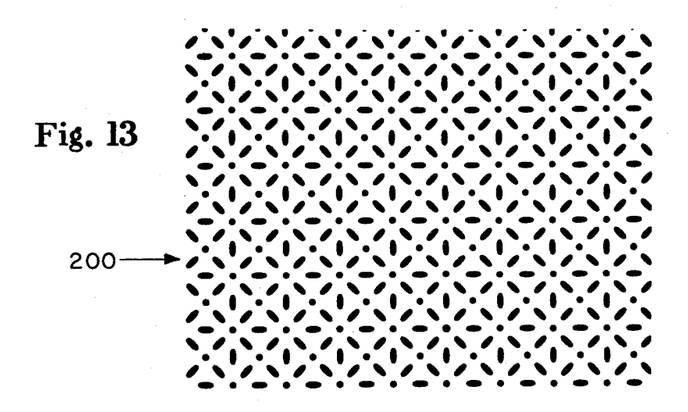
FIG. 13 is an enlarged plan view of an embossment pattern suitable for use on laminate structures of the present invention.
Figure 14:
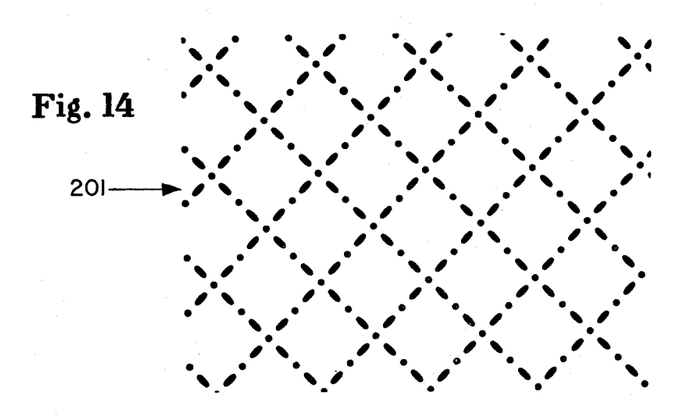
FIG. 14 is an enlarged plan view of another embossment pattern suitable for use on laminate structures of the present invention, all of the embossment points of which are common to the embossment pattern illustrated in FIG. 13.

Typical embossing patterns are illustrated in FIGS. 13 and 14. It should be noted that although embossment points 28 on embossing roll 26 must have at least some points in common with embossment points 29 on embossing roll 27, it is not necessary that all embossment points 28 and 29 be common to one another. Thus, for example, embossing pattern 200 illustrated in FIG. 13 could be utilized on embossing roll 26 while embossing pattern 201 illustrated in FIG. 14 could be utilized on embossing roll 27. Those embossment points in pattern 200 which are either not common to or not aligned with embossment points in pattern 201 would tend to emboss the outermost ply with which they are brought in contact, but little or no bonding of the outermost ply to the central ply 2 would occur at such points due to the lack of mating embossment points on the opposing embossing roll, thereby resulting in insufficient pressure for bonding at those particular points.

As alluded to earlier in this specification, outer plies 34 and 35 are preferably comprised of highly creped, wet strength tissue paper. The amount of crepe present in the outer plies may vary between about 15 and about 50 percent, and is most preferably betweeen about 25 and about 35 percent. The outer plies 34 and 35 are supplied from parent rolls 44 and 45. Outer ply 34 is fed about fixed rolls 42, 38 and 36 and vertically-movable roll 40, while outer ply 35 is fed about fixed rolls 43, 39 and 37 and vertically-movable roll 41. Tension in each of the outer plies 34 and 35 is controlled by applying a braking force by means well known in the art to prevent freewheeling rotation of parent rolls 44 and 45 as the plies are withdrawn, as well as by the positioning of vertically-movable rolls 40 and 41. If the tension maintained in plies 34 and 35 is excessive, the amount of crepe contained in the outermost plies of the laminate structure 46 will be reduced, thereby detracting from the caliper and bulk impression of the final product. On the other hand, sufficient tension must be maintained so that plies 34 and 35 will be caused to approximate the contours of embossing rolls 26 and 27 when they pass between the relatively soft (between about 45 and about 65 Shore A Durometer), smooth-surfaced rubber rolls 30 and 31 and the hard-surfaced embossing rolls. This is more clearly illustrated in FIG. 4, wherein the highly creped outer plies 34 and 35 have assumed the approximate contours of embossing rolls 26 and 27 prior to lamination to the reinforced central ply 2. Rubber rolls 30 and 31 are preferably mounted so as to exert a constant force on outer plies 34 and 35 as the plies pass through the nip between each rubber roll and the corresponding embossing roll. In a preferred embodiment of the present invention, this is accomplished by means of either pneumatically or hydraulically operated cylinders 32 and 33 which are controlled by pressure regulating devices well known in the art. The force applied to rubber rolls 30 and 31 depends upon the amount of emboss desired in outermost plies 34 and 35.

Figures 2, 4:
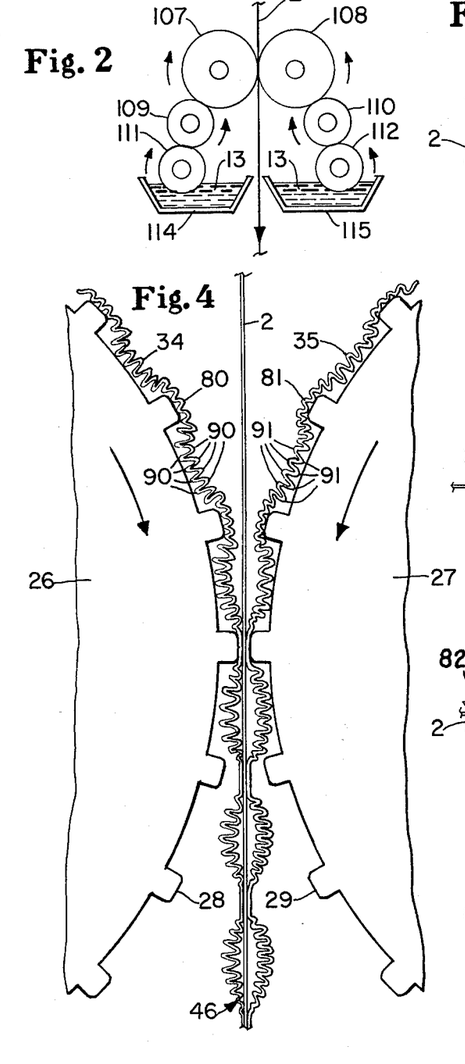
FIG. 2 is a schematic representation of alternative apparatus for imprinting a pattern of reinforcing resin on each side of the central tissue ply which may be utilized in place of the imprinting apparatus illustrated in FIG. 1.
FIG. 4 is an enlarged sectional view illustrating a preferred method of joining the various plies of the structure together by passing them simultaneously between mating embossment points on a pair of synchronously-driven, hard-surfaced embossing rolls such as are illustrated schematically in FIG. 1.

The laminating operation which is performed between mating embossment points 28 and 29 on hard-surfaced embossing rolls 26 and 27 is also illustrated in greater detail in FIG. 4. Embossing rolls 26 and 27 are driven in synchronization with each other and with the movement of the reinforced central ply 2 so that mating embossment points 28 and 29 are in opposition to each other at the point of tangency between embossing rolls and the central ply 2. The distance between mating embossment points 28 and 29 on the embossing rolls at the aforementioned point of tangency typically ranges from approximately 0.5 mils when all plies passing between the nip have creped basis weights (prior to imprinting) of approximately 8 pounds per 3,000 sq. ft. to approximately 2.5 mils when all such plies have creped basis weights (prior to imprinting) of approximately 20 pounds per 3,000 sq. ft.

Following the laminating process, the laminated structure 46 is passed through the nip betweeen a pair of smooth-surfaced rolls 48 and 49. Roll 48 preferably has a relatively soft rubber surface (between approximately 30 and approximately 60 Shore A Durometer) while roll 49 preferably has a relatively hard surface. This final calendering operation is designed to momentarily crush the laminate structure 46, and thereby improve its overall softness and drape, i.e., the momentary crushing is believed to significantly reduce the columnar strength of the fiber structure. In addition, the final calendering operation ensures that the same number of sheets may be wound on a roll of a given size. The gap between calender rolls 48 and 49 is usually considerably less than the caliper of the final structure. For example, a multi-layered structure having a caliper between about 50 and about 60 mils after laminating as measured under a load of 50 gm. per sq. in., which is subsequently passed between a pair of calender rolls 48 and 49 adjusted to a gap between about 8 and about 12 mils will result in a product having a caliper in the range of approximately 30 mils, as measured under a load of 80 gm. per sq. in. The minimum gap between rolls 48 and 49 is controlled by adjusting the movable stop 65 on cylinder 47 so that it bottoms against fixed member 66 when the cylinder is extended. To prevent tearing or destruction of the laminate structure 46 in the event a significant increase in thickness is encountered during the calendering operation, it is preferred that one of the calender rolls not be fixed. Therefore, roll 48 is maintained in position by means of constant force. The force applied by roll 48 is preferably controlled by means of a pneumatically or hydraulically operated cylinder 47 operating in conjunction with pressure regulating means well known in the art. The pressure is preferably adjusted so that roll 48 will give way rather than tear the laminate structure 46 if an obstruction is encountered.

In order to provide a significant increase in the final product's wet tensile strength it is necessary to cure the reinforcing resin utilized in a preferred embodiment of the present invention. By curing the resin to the optimum level, the normal increase in wet tensile strength is generally at least 100 percent. The normal increase in dry tensile strength, on the other hand, is on the order of 5 to 10 percent. While it is undoubtedly possible to effect curing, i.e., to effect self-crosslinking, of an acetate/ethylene copolymer resin such as is used in a preferred embodiment of the present invention by means other than forced convection of hot air, i.e., free convection of hot air, microwave heating, dielectric heating, etc., forced convection appears to be the most practical means of achieving the desired objective.

Because complete curing of the resin imprinted on the central ply 2 prior to laminating would adversely affect bonding of the outer plies 34 and 35 to the central ply, the most suitable location for curing is downstream from the laminating station. If the curing step is not carried out until after the laminate structure 46 has been wound into finished rolls, the time required for curing is considerably greater, and the risk of damage to or discoloration of the laminate structure becomes greater. This is due to the fact that the portions of the laminate structure 46 closest the center of the roll are shielded by the outermost portions. Thus, applicant, in a preferred embodiment of the present invention, effects curing of the laminate structure 46 prior to final decorating and winding into rolls.

A hot air drying apparatus similar to that utilized prior to the laminating station is preferably employed. Hot air is continuously introduced through flow channels 50 and 51 into distributor boxes 52 and 53 which extend across the entire width of the laminate structure 46. The hot air is thus forced to impinge on the outermost surfaces of the laminate structure 46 through a plurality of orifices 54 and 55. The bulk of the hot air brought into contact with the outermost surfaces of the laminate structure 46 is collected in collector boxes 56 and 57, which also extend across the entire width of the laminate structure 46, and is discharged through flow channels 58 and 59. The exhausted air is preferably reheated and reintroduced through flow channels 50 and 51 by means well known in the art.

The laminate-structure 46 typically contains a total of between about 3 and about 8 percent moisture upon entrance into collector boxes 56 and 57. Applicant has determined that when a resin such as Elvace EP 1962 available from E. I. DuPont De NeMours & Company, Inc., of Wilmington, Del., is employed as a print-on reinforcement, curing of the resin does not begin to take place until most of the moisture has been driven from the laminate structure 46. Thus, the hot air drying apparatus comprised of flow channels 50 and 51, distributor boxes 52 and 53, a plurality of orifices 54 and 55, collector boxes 56 and 57, and flow channels 58 and 59 must in addition to driving out the moisture contained in the laminate structure 46, raise the temperature of the resin to a point sufficient to initiate the self-crosslinking process.

When curing a laminate structure of the present invention having a total basis weight of about 40 pounds per 3,000 sq. ft. and containing between about 3 and about 8 percent moisture, a forced convection of 350°F hot air impinging on both sides of the laminate structure 46 at a head pressure of between about 15 and about 20 inches of water have been found satisfactory in a residence time of approximately 1.0 seconds. As with the hot air drying apparatus located ahead of embossing rolls 26 and 27, it is desirable that the hot air drying apparatus employed to cure the resin contained in the laminate structure 46 be designed to permit curing in a minimum amount of time, thereby minimizing the size of the equipment.

The wet tensile strength of the laminate structure 46 appears to be approximately proportional to the amount of curing of the resin up to a point, but additional curing beyond the optimum point tends to depress the product's wet strength and may adversely affect its absorbency properties. The point of optimum curing is dependant primarily upon the type of resin employed, the quantity of resin solids applied, and the total moisture content of the laminate structure 46.

After the curing process has been completed, the laminate structure 46 is fed about fixed roll 60 to decorating and roll winding apparatus well known in the art.

In FIG. 1, the equipment utilized to imprint each side of the central ply 2 with a reinforcing pattern of resin emulsion 13 comprises what is hereinafter referred to as dual offset gravure imprinting apparatus. FIG. 2 is an illustration of alternative apparatus which could be utilized with equal facility to imprint opposite sides of the relatively inextensible central ply 2 with a resin reinforcing pattern. The equipment illustrated in FIG. 2 is hereinafter referred to as dual flexographic imprinting apparatus. Instead of applying the resin emulsion 13 to the central ply 2 by means of smooth-surfaced rubber rolls 7 and 8 as illustrated in FIG. 1, the dual flexographic process illustrated in FIG. 2 employs a pair of rolls 107 and 108 having a raised rubber imprinting pattern thereon. The raised rubber imprinting pattern on rolls 107 and 108 is coated with resin emulsion 13 by engraved metal metering rolls 109 and 110, said metering rolls having a uniform surface texture comprised of a multiplicity of tiny inverted pyramids. The surface of metering rolls 109 and 110 is designed to pick-up a predetermined amount of resin emulsion 13 from smooth-surfaced rubber rolls 111 and 112 which are in contact with a pool of resin emulsion, and transfer a uniform amount of the resin emulsion to the raised rubber printing surfaces on rolls 107 and 108. Resin troughs 114 and 115 illustrated in FIG. 2 are similar to resin troughs 14 and 15 illustrated in FIG. 1. Rolls 107, 108, 109 and 110 illustrated in FIG. 2 are driven in synchronization with each other as well as with the movement of central ply 2. Rolls 111 and 112 are normally driven at a slower speed to provide a doctoring action on rolls 109 and 110.

Although the dual flexographic imprinting system illustrated in FIG. 2 does not require the use of doctor blades, it does present a serious limitation not common to the dual offset gravure imprinting system illustrated in FIG. 1. Because the resin emulsion 13 must undergo two transfers, one from rubber rolls 111 and 112 and another from engraved metal rolls 109 and 110, in the system illustrated in FIG. 2, there is an inherent limitation on the quantity of resin emulsion that can be transferred without smearing of the imprinting pattern. Thus, when it is desired to apply greater quantities of resin emulsion 13 to the central ply 2 to provide greater strength in the final structure, the dual offset gravure imprinting system illustrated in FIG. 1 is preferred.

FIG. 3 is a fragmentary perspective view of the several components utilized in a preferred embodiment of the present invention prior to laminating. The central ply 2 is preferably comprised of cellulosic tissue paper having a total stretch, including the small amount of crepe introduced during removal from the drying drum, of less than about 10 percent. Its basis weight, as measured after removal from the drying drum, is preferably between about 8 and about 20 pounds per 3,000 sq. ft. The outer plies 34 and 35 are preferably comprised of cellulosic tissue paper having between about 15 and about 50 percent crepe. For purposes of this application, percent crepe shall be defined as the percentage reduction in length of the sheet which results from the creping opration, i.e., 15 percent crepe means that the length of the sheet after creping is only 85 percent of the length of the sheet prior to creping and 50 percent crepe means that the length of the sheet after creping is only 50 percent of the length of the sheet prior to creping. The preferred range of basis weights for the outer plies 34 and 35 is from about 8 to about 20 pounds per 3,000 sq. ft., as measured after the desired amount of crepe has been imparted.

In a preferred embodiment of the present invention, outer plies 34 and 35 and central ply 2 incorporate a wet strength resin which is added during the papermaking operation. One such resin which has been found suitable for this purpose is Kymene S-2064 available from Hercules, Inc. of Wilmington, Del. Production of such wet strength resins is described generally in U.S. Pat. No. 3,700,623 issued to Keim on Oct. 24, 1972. Kymene S-2064 is a cationic material which is both alkaline and chlorine resistant. Therefore, it provides excellent wet strength for a heavy-duty towel. The resin is preferably diluted to a solids content of between about 6 and about 7 percent, and its pH is then raised to approximately 10.0 by adding a dilute solution, preferably about 4 percent, of caustic soda. Extreme care is required, however, as addition of either too much of too concentrated a caustic solution will cause gelling of the mixture, thus making it unstable.

The dilute wet strength resin is preferably added to the cellulosic stock in the mixing operation in what is commonly known in the papermaking industry as the quick mix chest. The resin is added in the ratio of about 5 to about 20 pounds of resin solids per ton of dry cellulosic stock. In order to realize improved wet strength in paper produced utilizing a wet strength resin such as Kymene S-2064, it is necessary to add between about 5 and about 50 percent, preferably between about 30 and about 35 percent, carboxymethyl cellulose (based on the weight of wet strength resin solids added) to the stock solution containing the wet strength resin at a point downstream of the quick mix chest. This is preferably done by adding a 1 percent solution of carboxymethyl cellulose at either the suction side of the stock pump or the suction side of the fan pump. If excessive amounts of carboxymethyl cellulose are employed, undesirable gelling of the stock results. A slight degree of discoloration, primarily yellowing, may occur with the use of a wet strength resin such as Kymene S-2064. This can be compensated for by the addition of any of several tinting dyes well known in the paper industry. Other commercially available wet strength resins having wet strength properties generally similar to Kymene S-2064, some of which need not be used in conjunction with carboxymethyl cellulose, may be used with equal facility to produce the desired increase in wet strength.

The resin emulsion 13 applied to the central ply 2, in a preferred embodiment of the present invention, forms reinforcing patterns such as are illustrated in FIGS. 3, 5, 11 and 12. As indicated earlier in this specification, the wet and dry tensile strength of the laminate structure 46 is proportional to the amount of the resin solids applied to the central ply 2 as well as to the degree of curing of the resin contained in the final structure.

In order to minimize the thermal or other type of energy input required to reduce the moisture content of the central ply 2 to a satisfactory level prior to laminating and to satisfactorily cure the laminated structure 46, the resin emulsion 13 is preferably applied at the greatest solids concentration feasible. In the case of a self-crosslinking acetate/ethylene copolymer resin such as DuPont Elvace EP 1962, this concentration is about 50 percent due to the fact that this particular resin is not commercially available at higher solids concentrations. Another inherent negative in applying resin emulsions at extremely low solids concentrations is the loss of printing quality caused by wicking. This is particularly undesirable where, as in the present invention, it is desirable to maintain the reinforcing pattern imprinted on one side of the central ply 2 in register with an identical reinforcing pattern imprinted on the opposite side.

As is illustrated schematically in FIG. 1, the highly creped outer webs 34 and 35 are embossed as each ply passes between rubber rolls 30 and 31 and their respective embossing rolls 26 and 27. The flexing action of rubber rolls 30 and 31 causes the outer plies 34 and 35 to assume generally the contour of the outer periphery of embossing rolls 26 and 27. Embossments 80 and 81 illustrated in FIG. 4 are formed in the respective outer plies 34 and 35 between embossment points 28 and 29 on embossing rolls 26 and 27 and rubber rolls 30 and 31 due to the exertion of higher pressure by the rubber rolls at these points. Outer plies 34 and 35 are preferably bonded by means of the reinforcing resin contained on the central ply 2 through pressure exerted between mating embossment points 28 and 29 on synchronously driven, hard-surfaced embossing rolls 26 and 27.

FIG. 5 is an enlarged fragmentary perspective view of a multi-layered structure of the present invention after the outermost plies 34 and 35 have been bonded to the central ply 2. Crepe ridges 90 and 91 are substantially parallel to the cross-machine direction of the laminate structure 46. The reinforced central ply 2 has been folded back to more clearly illustrate the relation of embossments 80 in outermost ply 34 to embossments 81 in outermost ply 35. The reinforced central ply 2 remains essentially planar even after the laminating operation illustrated in FIG. 4 due to the fact that embossments 80 in outermost ply 34 are in superposition with embossments 81 in outermost ply 35.

Figure 6:
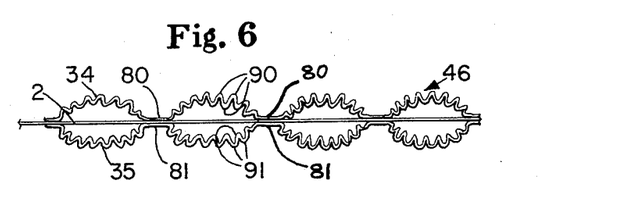
FIG. 6 is an enlarged sectional view taken along line 6—6 of FIG. 5.
Figure 7:
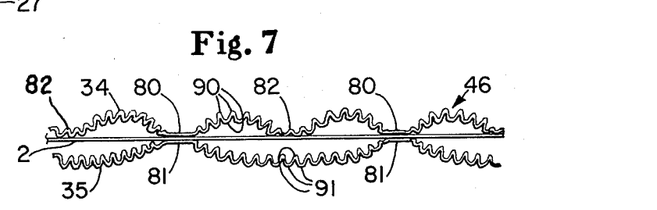
FIG. 7 is an enlarged sectional view generally similar to FIG. 6, but illustrating an alternative embodiment of the present invention which results when dissimilar embossing patterns having some, but not all, embossment points in common are utilized on the embossing rolls illustrated schematically in FIG. 1.

This latter feature is more clearly illustrated in FIG. 6 which is a cross-sectional view taken along section line 6—6 in FIG. 5. FIG. 7, on the other hand, which is similar to FIG. 6, illustrates an alternative embodiment of the present invention. FIG. 7 is typical of a laminate structure 46 produced when similar but not identical patterns are employed to emboss and laminate outermost plies 34 and 35 to a reinforced central ply 2. Although embossing of outermost plies 34 and 35 occurs at all embossment points contained on their respective embossing rolls, effective bonding of the outermost plies to the central ply 2 occurs only at embossments common to both outer plies, i.e., effective bonding occurs at mating embossments 80 and 81, but not at 82. In addition, it should be noted that embossments 82 are not compressed to the same extent as embossments 80 and 81 in the final structure due to the fact that significant pressure is not generated at such points during the laminating process. Applicant has learned that in order to provide satisfactory bonding of the outermost plies 34 and 35 to the central ply 2 without destroying the bulk impression of the product, the area of mating emboss common to both outermost plies should preferably be between approximately 7 and approximately 50 percent of the total surface area of each outer ply, and most preferably between approximately 10 and approximately 25 percent. If the area of mating emboss common to both outermost plies is less than about 7 percent, then at least one of the outermost plies would have to be adhered to the central ply by means of a conventional laminating adhesive. It should be noted, however, that the embossed area in each outermost ply should still preferably constitute between approximately 7 and approximately 50 percent of the total surface area of each outer ply.

Figure 8:
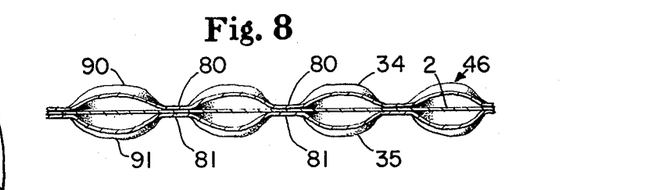
FIG. 8 is an enlarged sectional view taken along line 8—8 of FIG. 5.

FIG. 8 is an enlarged sectional view taken along section line 8—8 in FIG. 5. Crepe ridges 90 and 91 in outermost plies 34 and 35 are substantially parallel to the cross-machine direction of the laminate structure 46.

Figures 9, 10:
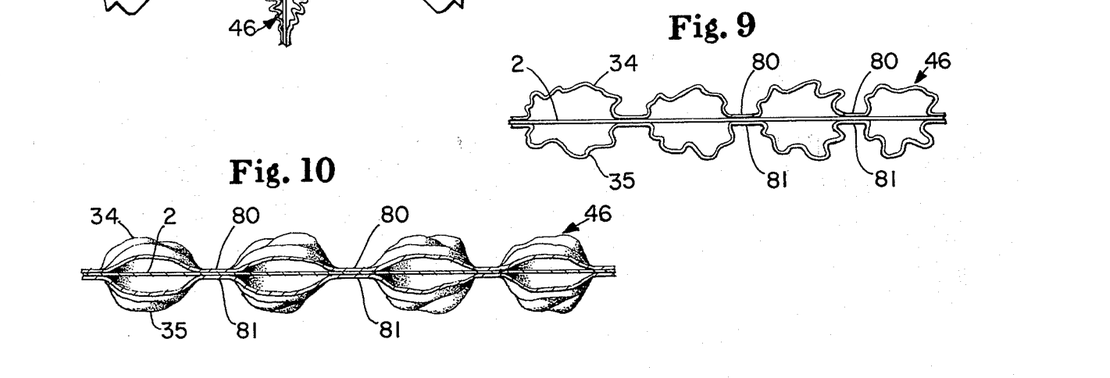
FIG. 9 is a view similar to that of FIG. 6, but illustrating the condition of the structure after it has been wetted.
FIG. 10 is a view similar to that of FIG. 8, but illustrating the condition of the structure after it has been wetted.

FIGS. 5 through 8 illustrate laminate structures of the present invention prior to wetting. FIG. 9, on the other hand, is a corresponding view of the laminate structure illustrated in FIG. 6 after the structure has become wetted. It is important to note that upon wetting, the outermost plies of highly creped tissue paper 34 and 35 begin to expand. However, since the outermost plies 34 and 35 are intermittently bonded to the relatively inextensible, reinforced central ply 2 at mating embossments 80 and 81, the only direction in which the outermost plies can expand is essentially perpendicular to the central ply 2, i.e., in the Z-direction. As the crepe ridges 90 and 91 in outermost plies 34 and 35 become obscured, the wet bulk impression of the laminate structure 46 increases. This condition is further illustrated in FIG. 10, which is a view corresponding to that of FIG. 8, but illustrated after the laminate structure 46 has become wetted.

Because the reinforced central ply 2 is relatively inextensible in addition to being alkaline and chlorine resistant, it provides dimensional stability to the wetted structure. After proper curing of the reinforcing resin contained in the laminate structure 46, its wet strength is increased several fold. Laminate structures produced in accordance with the present invention also exhibit very high resistance to delamination, even when subjected to relatively hard abrasive use in a wetted condition. Thus, in most applications, laminated product made in accordance with the present invention is considered to be reusable.

To further illustrate the superior bulk, strength, tensile ratio, drape and absorption characteristics of laminate structures of the present invention, sample sheets were produced and their properties quantitatively compared to prior art multilayered structures.

The comparative tests conducted on the various structures were carried out as follows:

Dry Caliper

This was obtained on a Model 549M motorized micrometer such as is available from Testing Machines, Inc. of Amityville, Long Island, N.Y. Product samples were subjected to a loading of 80 gm. per sq. in. under a 2 in. diameter anvil. The micrometer was zeroed to assure that no foreign matter was present beneath the anvil prior to inserting the samples for measurement and calibrated to assure proper readings. Measurements were read directly from the dial on the micrometer and are expressed in mils.

Wet Caliper

This was obtained utilizing the same instrument and the same basic procedures utilized to measure dry caliper, but product samples were first saturated with water and placed on an absorbent pad under no load for a period of approximately 5 seconds to remove excess water prior to making the measurement.

Dry Tensile Strength

This was obtained on a Thwing-Albert Model 38-4 tensile tester such as is available from the Thwing-Albert Instrument Company of Philadelphia, Penna. Product samples measuring 1 in. by 6 in. were cut in both the machine and cross-machine directions. Each sample strip was placed in the jaws of the tester, set at a 4 in. gauge length. The crosshead speed during the test was 12 in. per minute. Readings were taken directly from the scale on the tester at the point of rupture and are expressed in grams/in.

Wet Tensile Strength

This was obtained on the same instrument used to obtain dry tensile strength, but a Finch wet strength cup, also available from the Thwing-Albert Instrument Company, was attached to the lowermost jaw of the tester. Product samples were cut to a size of 1 in. by 10 in. in both the machine and cross-machine directions. Sample strips of material were looped about the cross-bar in the Finch wet strength cup and both ends secured in the uppermost jaw of the tester. The movable portion of the Finch wet strength cup was then raised so that the cross-bar was immersed to a depth of ¾ in. below the surface of the water contained in the cup, and the sample allowed to soak for 5 seconds before the test was initiated. The gauge length between the cross-bar in the Finch wet strength cup and the uppermost jaw of the tester was set at 4 in., and the crosshead speed during the test was 12 in. per minute. Readings were taken directly from the scale on the tester and are expressed in grams/in.

Stretch

Stretch is the percent machine direction and cross-machine direction elongation of the laminate structure prior to rupture and is read directly from a secondary scale on the Thwing-Albert tensile tester. Wet and dry stretch readings were taken concurrently with wet and dry tensile strength readings.

Machine Direction Tearing Resistance

This was obtained on a 1600-gram capacity Elmendorf Model 60–100 tearing tester such as is available from the Thwing-Albert Instrument Company of Philadelphia, Penna. The test is designed to measure the tearing resistance of sheets in which a tear has been started. Product samples were cut to a size of 2½ in. by 3 in., with the 2½ in. dimension aligned parallel to the machine direction of the samples. Sixteen product samples were stacked one upon the other and clamped in the jaws of the tester so as to align the direction of tear parallel to the 2½ in. dimension. A ½ in. long cut was then made at the lowermost edge of the stack of samples in a direction parallel to the direction of tear. A Model 65-1 digital read-out unit, also available from the Thwing-Albert Instrument Company, was zeroed and calibrated using an Elmendorf No. 75 calibration weight prior to initiating the test. Readings were taken directly from the digital read-out unit and inserted into the following equation:

$$\text{Tearing Resistance} = \left[ \frac{\text{Tear Tester capacity (gm.)} \times \text{Reading from Digital Read-out Unit (\%)}}{\text{Number of plies of Product Tested}} \right] \times \frac{1}{100}$$

Results are expressed in terms of grams/ply of product.

Peel Strength

This was obtained on 100-gram capacity Instron Model TM tester such as is available from the Instron Corporation of Canton, Mass. This test was designed to measure the peel strength of the various laminate structures. In the case of two-ply structures, this was merely a measure of the force required to separate the plies from one another. In the case of three-ply structures, this was a measure of the force required to separate only one outermost ply from the balance of the structure. Product samples were cut to a size of 3 in. wide by approximately 11 in. long. The plies to be separated were clamped in the jaws of the Instron tester with an initial gauge length set at 5/16 in. The samples were oriented in the tester so that the 3 in. dimension of the samples was perpendicularly aligned to the direction of movement of the crosshead. The speed of the crosshead during the test was 10 in. per minute. The test consisted of separating each 3 in. wide product sample over a length of 6 in., i.e., 12 in. total travel of the crosshead. Readings were taken directly from an Instron Model D1-53 Integrator calibrated at 5,000 counts per minute - full scale. An Instron chart recorder, operated simultaneously with the Model D1-53 Integrator at a chart speed of 10 in. per minute, was used to monitor the test. Peel strength was then calculated according to the following equation:

$$\text{Peel Strength} = \frac{\left[\dfrac{\text{Integrator Reading}}{\text{Number of counts/min. for full scale deflection}}\right] \times \left[\dfrac{\text{Recorder Chart Speed (in./min.)}}{\text{Distance Recorder Chart Traveled while Integrator was Running (in.)}}\right] \times [\text{Capacity of Tester (grams)}]}{[\text{Sample width (in.)}] \times \left[\dfrac{\text{Crosshead Speed (in/min.)}}{1}\right] \times \left[\dfrac{\text{Distance Recorder Chart Traveled while Integrator was Running (in.)}}{\text{Recorder Chart Speed (in./min.)}}\right]}$$

Results are expressed in terms of grams/sq. in.

and sample. Since the dry weight of the product sample was also known, the following calculation was performed:

$$\text{Water Absorbed per unit of Product} = \frac{\left[\begin{array}{l}\text{Total Quantity of Water}\\ \text{Absorbed by Known Quantity of Product (gm.)}\end{array}\right]}{\left[\begin{array}{l}\text{Dry Weight of Known Quantity of}\\ \text{Product (gm.)}\end{array}\right]}$$

Handle-O-Meter

This was obtained on a Catalog No. 211-2 Handle-O-Meter such as is available from the Thwing-Albert Instrument Company of Philadelphia, Pa. Handle-O-Meter values give an indication of sheet stiffness and sliding friction which are in turn related to handle, softness and drape. Lower Handle-O-Meter values are indicative of less stiffness, and hence point toward better handle, softness, and drape. Product samples were cut to a size of 4 in. by 4 in., and two samples placed adjacent one another across a slot having a width of 0.375 in. for each test. Whenever two such samples produced a reading off the Handle-O-Meter scale, a single sample was utilized, and the result doubled. Handle-O-Meter values in the machine direction were obtained by aligning the machine direction of the product samples parallel to the Handle-O-Meter blade, while Handle-O-Meter values in the cross-machine direction were obtained by aligning the cross-machine direction of the product samples parallel to the Handle-O-Meter. Handle-O-Meter results are expressed in grams.

Absorptive Capacity

One facet of a product's overall absorbency is its absorptive capacity for water. This test was utilized to determine the capacity of each product to absorb water at a specified flow rate in a specified time. Product samples were cut to a size of 4 in. by 4 in., stacked 8-high, and placed in a polyurethane holder on an inclined plane of an absorptive capacity tester. The weights of both the sample and of the polyurethane holder were determined prior to wetting of the sample. Product samples were placed in the polyurethane holder such that their cross-machine direction was aligned parallel to the inclined plane. Water was introduced at the uppermost end of the inclined plane at a controlled rate of 500 ml./minute for a period of 1 minute. The saturated sample was allowed to remain on the inclined polyurethane holder for an additional 45 seconds after the water had been turned off during which time excess water was removed from the polyurethane holder, care being taken not to contact the saturated sample. The weight of the polyurethane holder and the saturated sample was then measured. The amount of water absorbed by the product sample was determined by subtracting the dry weight of the polyurethane holder and sample from the wet weight of the polyurethane holder and sample.

Results are expressed in terms of grams of water absorbed/gram of product sample.

Rate of Absorption

Another facet of a product's overall absorbency is its rate of water absorption. This test was conducted by measuring the time in seconds required for 0.10 ml. of distilled water to be absorbed by a single 4 in. by 4 in. product sample using a Reid style tester such as is described in detail in an article by S. G. Reid entitled "A Method for Measuring the Rate of Absorption of Water by Creped Tissue Paper," which appears at pages T-115 to T-117 of *Pulp and Paper Magazine of Canada*, Volume 68, No. 3, Convention Issue, 1967. Tests were conducted by simultaneously opening the stopcock located between the calibrated pipette and the capillary tip contacting the product sample and starting a timer, observing the water level in the pipette as the water was being absorbed by the product sample, and stopping the timer when exactly 0.10 ml. of water had been dispensed from the calibrated pipette. Readings were taken directly from the timer and are expressed in seconds. Lower times are indicative of a higher rate of water absorption.

Examples I, II and III, hereinafter set forth, describe in detail several absorbent wiping products analyzed by means of the aforementioned tests. A comparison of the results is set forth in Table I.

EXAMPLE I

A laminate structure was produced generally in accordance with the procedures hereinbefore described utilizing a cellulosic tissue center ply having a basis weight of approximately 10 pounds per 3,000 sq. ft. at approximately 8 percent crepe prior to imprinting. Conventional processing and papermaking techniques were employed in producing the center ply. Approximately 20 pounds per ton of Kymene S-2064 wet strength resin such as is available from Hercules, Inc. of Wilmington, Delaware, and 10 pounds per ton of carboxymethyl cellulose were added to the furnish which was comprised of 60 percent softwood kraft and 40 percent hardwood sulfite. The center ply was produced generally in accordance with the teachings of U.S. Pat. No. 3,301,746 issued to Sanford et al., on Jan. 31, 1967 on a 36 × 30 square mesh fabric.

Both outermost plies were produced with a basis weight of approximately 16 pounds per 3,000 sq. ft. at approximately 30 percent crepe. Conventional processing and papermaking techniques were employed in producing both outermost plies. Approximately 20 pounds per ton of Kymene S-2064 wet strength resin and 10 pounds per ton of carboxymethyl cellulose were added to the furnish which was comprised of 70 percent softwood kraft aand 30 percent hardwood sulfite. Both outermost plies were produced generally in accordance with the teachings of U.S. Pat. No. 3,301,746 issued to Sanford et al., on Jan. 31, 1967 on a 31 × 27 semi-twill fabric.

The center ply was imprinted on each side with Elvace EP-1962, a self-crosslinking acetate/ethylene copolymer resin available from E. I. Dupont De NeMours & Company, Inc. of Wilmington, Del., at a rate of approximately 2.1 pounds of solids per 3,000 sq. ft. per side. A diamond-shaped imprinting pattern comprised of lines having a thickness of 0.020 inches and arranged 15 lines per inch in the machine direction by 7 lines per inch in the cross-machine direction was employed. No attempt was made to print the diamond pattern on one side of the central ply in register with the diamond pattern on the opposite side of the central ply. The reinforced central ply material was stored in roll form for a period of approximately 4 weeks at ambient temperatures before the final converting operation was performed.

The outermost plies were laminated to the central ply by means of the reinforcing resin utilizing mating knob-style embossment patterns having 64 knobs per sq. in. on each side of the structure. The area embossed by the knobs constituted approximately 17 percent of the structure's total surface area on each side. The laminate structure was calendered by passing it through the nip between a pair of calender rolls adjusted to a minimum gap of about 10 mils to meet the target caliper of approximately 30 mils.

Individual sheets of the product were then cured by inserting them into an oven in which 350°F hot air was being circulated for a period of 2 minutes.

Basis weight of the finished laminate structure was approximately 39.9 pounds per 3,000 sq. ft.

EXAMPLE II

A two-ply laminate structure was produced generally in accordance with the teachings of U.S. Pat. No. 3,414,459 issued to Wells on Dec. 3, 1968. Two identical cellulosic tissue plies, each having a basis weight of approximately 13.5 pounds per 3,000 sq. ft. at approximately 20-30 percent crepe were employed. Each ply was produced generally in accordance with the teachings of U.S. Pat. No. 3,301,746 issued to Sanford et al. on Jan. 31, 1967, on a 36 × 30 square mesh fabric utilizing a furnish comprised of 60 percent softwood kraft and 40 percent hardwood sulfite.

Each ply was embossed with mating knob-style embossment patterns having 72 knobs per sq. in., and the two plies joined together at the mating embossment points by means of a conventional polyvinyl alcohol laminating adhesive.

The area embossed by the knobs constituted approximately 25 percent of the structure's total surface area on each side.

No curing of this product was necessary.

The product was perforated at 11 inch intervals and wound into 5.80 inch diameter rolls, 11 inches wide, and containing 120 sheets.

Basis weight of the finished laminate structure was approximately 28.0 pounds per 3,000 sq. ft.

EXAMPLE III

A commercially available three-ply laminate structure which appears to have been produced generally in accordance with the teachings of U.S. Pat. No. 3,650,882 issued to Thomas on Mar. 21, 1972, was purchased from a retail outlet. An analysis of samples of the product yielded an apparent basis weight of about 12.0 pounds per 3,000 sq. ft. at a crepe of between approximately 50 and 70 percent for the center ply, and an apparent basis weight of about 12.0 pounds per 3,000 sq. ft. at a crepe of between approximately 10 and 20 percent for each of the outermost plies.

An embossment pattern comprised of a plurality of continuous sinusoidal waves, each having a width of about 1/16 inches, a total amplitude of about ¼ inch, spaced approximately 3/16 inches from one another, and oriented generally at an angle of about 45° to the machine direction, was employed to emboss each outermost ply. The patterns in each outermost ply were so aligned with respect to one another as to intersect at an angle of approximately 90°. Each outermost ply was apparently bonded to the central ply by means of a conventional laminating adhesive.

A fiber analysis of this product revealed that the furnish for each ply was apparently comprised of about 82 percent softwood kraft, about 3 percent softwood sulfite, and about 15 percent hardwood kraft.

The product, as purchased, was in 5.80 inch diameter rolls containing 70 sheets 11 inches in width by 11 inches in length.

Basis weight of the product was approximately 36.1 pounds per 3,000 sq. ft.

Table I, which follows, sets forth a comparison of the characteristics of the products described in Examples I, II and III above. Each product characteristic compared in Table I by means of the hereinbefore described tests was based upon an average value for all such tests actually conducted. However, a minimum of five such tests was conducted on each product in every instance.

TABLE I

| Product Characteristic Compared | Example No. I | Example No. II | Example No. III |
| --- | --- | --- | --- |
| Dry Caliper at 80 gm./sq. in. loading (mils) | 31.6 | 17.1 | 31.9 |
| Wet Caliper at 80 gm./sq. in. loading (mils) | 26.4 | 14.9 | 17.6 |
| Ratio of Wet Caliper: Dry Caliper (percent) | 83.5 | 87.2 | 55.2 |
| Dry Tensile strength (gm./in.) | | | |
| Machine Direction | 1,724 | 994 | 1,159 |
| Cross-Machine Direction | 1,387 | 767 | 666 |
| Wet Tensile Strength (gm./in.) | | | |
| Machine Direction | 796 | 223 | 235 |
| Cross-Machine Direction | 653 | 181 | 140 |

TABLE I-continued

| Product Characteristic Compared | Example No. I | Example No. II | Example No. III |
|---|---|---|---|
| Dry Stretch (Percent) | | | |
| Machine Direction | 8.0 | 12.0 | 11.8 |
| Cross-Machine Direction | 8.0 | 4.2 | 9.0 |
| Wet Stretch (percent) | | | |
| Machine Direction | 4.0 | 5.0 | 4.8 |
| Cross-Machine Direction | 6.0 | 2.2 | 4.0 |
| Dry Tensile Ratio Machine Direction: Cross-Machine Direction | 1.242 | 1.295 | 1.740 |
| Wet Tensile Ratio Machine Direction: Cross-Machine Direction | 1.218 | 1.232 | 1.680 |
| Machine Direction Tearing Resistance (gm./ply) | 78 | 50.2 | 74.1 |
| Peel Strength (gm./sq.in.) | 1.73 | 1.17 | 0.72 |
| Handle-O-Meter (gm.) | | | |
| Machine Direction | 59 | 35 | 49 |
| Cross-Machine Direction | 50 | 21 | 44 |
| Absorptive Capacity (gm. of water/gm. of product) | 15.0 | 13.1 | 15.0 |
| Rate of Absorption (time in seconds required to absorb 0.10 ml. of distilled water) | 36.2 | 10.7 | 32.5 |

A comparison of the characteristics set forth in Table I clearly demonstrates the superior strength, tensile ratio, bulk, and other related characteristics of product produced in accordance with the present invention in either a wet or a dry condition.

It is to be understood that the forms of the invention herein illustrated and described are to be taken as preferred embodiments. Various changes or omissions may be made in the converting process and/or the product without departing from the spirit or scope of the invention as described in the attached claims.

Having thus defined and described the invention, what is claimed is:

1. A method for producing a multi-layered absorbent paper wiping product, comprising the steps of:
   a. imprinting a continuous pattern of water-resistant, reinforcing resin on at least one side of a relatively inextensible central ply of tissue paper having less than about 10 percent total stretch, said pattern covering between about 15 and about 55 percent of the total surface area thereof;
   b. reducing the total moisture content of said resin-reinforced central ply to not more than about 10 percent; and
   c. intermittently bonding an outermost ply of highly extensible tissue paper having between about 15 percent and about 50 percent crepe to each side of said central ply at points of embossment formed in each of said outermost plies, said points of embossment constituting between about 7 percent and about 50 percent of the total surface area of each of said outermost plies.

2. A method for producing a multi-layered absorbent paper wiping product having a relatively inextensible central ply intermittently bonded to highly extensible outermost plies, comprising the steps of:
   a. imprinting a continuous pattern of water-resistant, reinforcing resin on at least one side of a central ply of tissue paper having less than about 10 percent total stretch, said pattern covering between about 15 and about 55 percent of the total surface area thereof;
   b. reducing the total moisture content of said resin-reinforced central ply to not more than about 10 percent;
   c. embossing each outermost ply of tissue paper having between about 15 percent and about 50 percent crepe to produce embossment points therein, said embossment points constituting between about 7 percent and about 50 percent of the total surface area thereof; and
   d. laminating said outermost plies to said central ply by bonding them to said central ply at points of embossment which are common to both of said outermost plies.

3. A method for producing a multi-layered absorbent paper wiping product having a relatively inextensible central ply intermittently bonded to highly extensible outer plies, comprising the steps of: a. imprinting a continuous pattern of water-resistant, reinforcing resin on at least one side of a central ply of wet strength tissue paper having less than about 10 percent total stretch, said pattern covering between about 15 and about 55 percent of the total surface area thereof;
   b. reducing the total moisture content of said resin-reinforced central ply to not more than about 10 percent;
   c. embossing each outermost ply of wet strength tissue paper having between about 15 and about 50 percent crepe to produce embossment points therein, said embossment points constituting between about 7 percent and about 50 percent of the total surface area thereof;
   d. laminating said outermost plies to said central ply by bonding them to said central ply at points of embossment which are common to both of said outermost plies; and
   e. momentarily crushing the laminated structure thus formed by calendering, thereby making its caliper more uniform and improving its overall softness and drape.

4. The method of claim 3, wherein the embossment points which are common to each of said outermost plies constitute between about 7 percent and about 50 percent of the total surface area thereof, and at least one of said outermost plies is bonded to said central ply at said common embossment points by means of the reinforcing resin contained on said central ply.

5. The method of claim 3, wherein the water-resistant, reinforcing resin imprinted on said central ply is comprised of a self-crosslinking polymer resin.

6. The method of Claim 5, including the step of curing the self-crosslinking polymer resin imprinted on said central ply to increase the strength of the laminated structure.

7. The method of claim 5, including the steps of:
   a. reducing the total moisture content of said resin-reinforced central ply to between about 2 and about 10 percent prior to laminating said outermost plies to said central ply; and b. curing said resin-reinforced central ply after laminating said outermost plies to said central ply to increase the strength of the laminated structure.

8. The method of claim 7, wherein the total moisture content of said resin-reinforced central ply is reduced by the application of thermal energy thereto.

9. The method of claim 7, wherein the laminated structure is cured by the application of thermal energy thereto.

10. The method of claim 7, wherein the reinforcing resin is applied to said central ply at a rate between about 1.0 and 4.0 pounds of resin solids per 3,000 sq. ft. per side.

11. The method of claim 7, wherein the creped basis weight of each of said plies prior to imprinting, is between about 8 and about 20 pounds per 3,000 sq. ft.

12. A method for producing a multi-layered absorbent paper wiping product having a relatively inextensible central ply intermittently bonded to highly extensible outermost plies, comprising the steps of:
 a. imprinting a continuous pattern of water-resistant, reinforcing resin of the self-crosslinking polymer variety on opposite sides of a central ply of wet strength tissue paper having less than about 10 percent total stretch at a rate between about 1.0 and about 4.0 pounds of resin solids per 3,000 sq. ft. per side, said pattern covering between about 15 percent and about 55 percent of the total surface area of each side thereof;
 b. reducing the total moisture content of said resin-reinforced central ply to between about 2 and about 10 percent prior to laminating said outermost plies of wet strength tissue paper having between about 15 and about 50 percent crepe to said central ply;
 c. producing embossment points constituting between about 7 and about 50 percent of the total surface area in each of said outermost plies by passing each of said plies between an elastomer-covered roll and one of a pair of synchronously driven, hard-surfaced embossing/laminating rolls;
 d. bonding said outermost plies to said central ply at embossment points common to each of said outermost plies, said common embossment points constituting between about 7 and about 50 percent of the total surface area thereof, with the reinforcing resin contained on said central ply by simultaneously passing all of said plies between said pair of synchronously driven, hard-surfaced, embossing/laminating rolls;
 e. momentarily crushing the laminated structure thus formed by calendering, thereby making its caliper more uniform and improving its overall softness and drape; and
 f. curing the self-crosslinking polymer resin contained in the laminated structure to increase its overall strength.

13. The method of claim 12, wherein the creped basis weight of each of said plies, prior to imprinting, is between about 8 and about 20 pounds per 3,000 sq. ft.

14. The method of claim 12, wherein the continuous patterns of reinforcing resin imprinted on opposite sides of said central ply are identical, and are printed in register with respect to one another.

15. A multi-layered absorbent paper wiping product, comprising a central ply of relatively inextensible tissue paper having less than about 10 percent total stretch, said central ply having a water-resistant, reinforcing resin imprinted on at least one surface thereof in a continuous pattern covering between about 15 percent and about 55 percent of the total surface area thereof, an outermost ply of highly extensible tissue paper having between about 15 percent and about 50 percent crepe and containing embossment points constituting between about 7 percent and about 50 percent of the total surface area thereof intermittently adhered to opposite sides of said central ply at said embossment points, the inextensibility of said central ply causing unadhered portions of said outermost plies to expand outwardly when the structure is wetted, thereby greatly enhancing the wet bulk caliper and impression of the structure.

16. A multi-layered absorbent paper wiping product, comprising a central ply of relatively inextensible tissue paper having less than about 10 percent total stretch, said central ply having a water-resistant, reinforcing resin imprinted on at least one surface thereof in a continuous pattern covering between about 15 percent and about 55 percent of the total surface area thereof, an outermost ply of highly extensible tissue paper having between about 15 percent and about 50 percent crepe and containing embossment points constituting between about 7 percent and about 50 percent of the total surface area thereof intermittently adhered to opposite sides of said central ply at embossment points which are common to both of said outermost plies, the inextensibility of said central ply causing said outermost plies to expand outwardly from said central ply when the structure is wetted, thereby greatly enhancing the wet bulk caliper and impression of the structure.

17. The multi-layered absorbent paper wiping product of claim 16, wherein each of said plies is comprised of wet strength tissue paper.

18. The multi-layered absorbent paper wiping product of claim 16, wherein the creped basis weight of each of said plies, prior to imprinting, is between about 8 and about 20 pounds per 3,000 sq. ft.

19. The multi-layered absorbent paper wiping product of claim 16, wherein the common embossment points in each of said outermost plies constitute between about 7 and about 50 percent of the total surface area thereof, and at least one of said outermost plies is adhered to said central ply at said common embossment points by means of the reinforcing resin contained on said central ply.

20. The multi-layered absorbent paper wiping product of claim 16, wherein the reinforcing resin is comprised of a self-crosslinking polymer resin.

21. The multi-layered absorbent paper wiping product of claim 16, wherein the reinforcing resin is applied to said central ply at a rate between about 1.0 and about 4.0 pounds of resin solids per 3,000 sq. ft. per side.

22. The multi-layered absorbent paper wiping product of claim 20, wherein the self-crosslinking polymer resin has been cured to produce optimum strength.

23. A multi-layered absorbent paper wiping product, comprising a central ply of relatively inextensible, wet strength tissue paper having less than about 10 percent total stretch, embossment central ply having a water-resistant, reinforcing resin of the self-crosslinking polymer variety imprinted on opposite surfaces thereof at a rate between about 1.0 and about 4.0 pounds of resin solids per 3,000 sq. ft. per side, said resin being imprinted in a continuous pattern covering an area constituting between about 15 and about 55 percent of the total surface area of each side thereof, an outermost ply of highly extensible, wet strength tissue paper having between about 15 and about 50 percent crepe and containing embossmentn points constituting between about 7 and about 50 percent of the total surface area thereof bonded to each side of said central ply by means of said reinforcing resin at embossment points common to both of said outermost plies.

24. The multi-layered absorbent paper wiping product of claim 23, wherein the common embossment points in each of said outermost plies constitute between about 7 and about 50 percent of the total surface area thereof.

25. The multi-layered absorbent paper wiping product of claim 23, wherein the patterns of reinforcing resin imprinted on opposite sides of said central ply are identical, and are printed in register with respect to one another.

26. The multi-layered absorbent paper wiping product of claim 23, wherein the water-resistant, reinforcing resin has been cured to produce optimum strength.

* * * * *